UNITED STATES PATENT OFFICE.

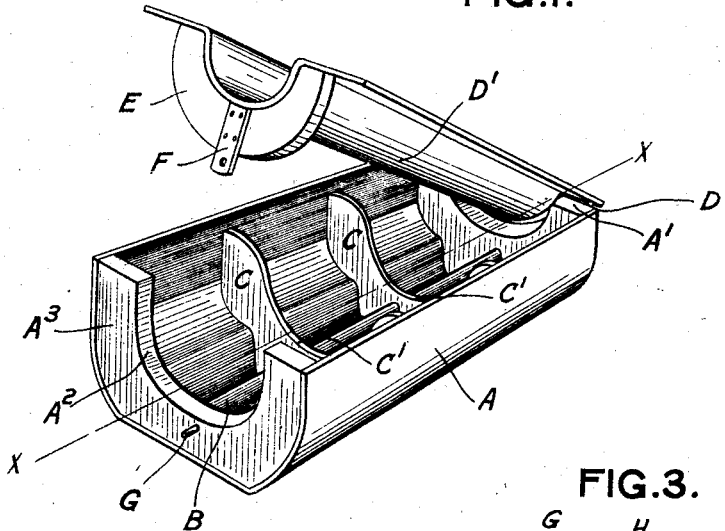
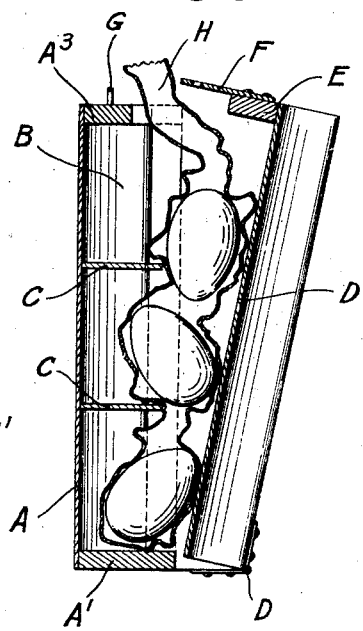
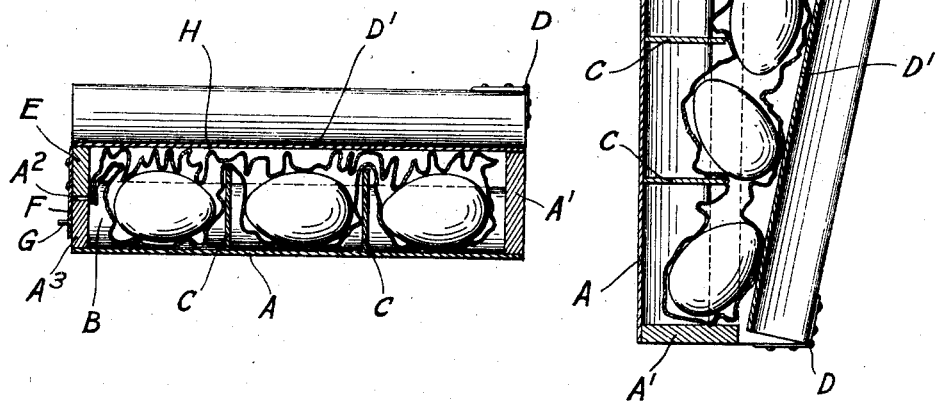

FREDRICK W. NERLICH, JR., OF ROCHESTER, NEW YORK.

EGG-CARRIER.

No. 901,639.   Specification of Letters Patent.   Patented Oct. 20, 1908.

Application filed November 18, 1907. Serial No. 402,649.

*To all whom it may concern:*

Be it known that I, FREDRICK W. NERLICH, Jr., a citizen of the United States, and resident of Rochester, in the county of Monroe and State of New York, have invented certain new and useful Improvements in Egg-Carriers, of which the following is a specification.

This invention relates to egg carriers, and has for its object to provide a substantial, uncrushable receptacle in which eggs may be transported with safety.

Other special advantages of the improvement will appear as it is described.

In the drawings:—Figure 1 is a perspective view of the improved carrier, with the cover raised to show the interior; Fig. 2 is a vertical, longitudinal section on the line x—x of Fig. 1, showing the cover down; and Fig. 3 is also a section on the line x—x of Fig. 1, but shows the cover raised.

The body A of the carrier is preferably rounded, as shown in Fig. 1, to conform to the contours of the eggs, so the sides will contact with the eggs and help to keep them in place. The interior of the carrier is divided into pockets for the eggs by a central, longitudinal partition B and transverse partitions C.

In the drawings a carrier is represented that is adapted to contain twelve eggs, but any number of eggs may, of course, be accommodated, according to the size of the carrier.

The cover is hinged at D to one end A' of the body of the carrier, and is adapted when closed to fit down snugly over the eggs so as to hold them in place within the pockets. In the drawings, the cover is represented as convex on its under side D', and the partitions C are correspondingly concaved at C' to receive the cover.

For the purpose of holding the cover rigidly in place when closed, a rounded block E is shown upon the free end of the cover that is adapted to fit a recess A² in the end A³ of the body of the carrier, and a latch F on this block locks the cover down when in engagement with the pin G.

A paper bag of the kind in use by retail merchants may be placed within the carrier, and the eggs placed within that. When the cover is closed, the eggs will lie within the pockets and the bag H will crumple up, as shown in Fig. 2, constituting a soft and safe packing around the eggs that will insure their safety.

An advantage peculiar to this carrier is that the eggs can be removed from it, without taking them from the bag, so that the eggs can be delivered in the bag and the carrier itself returned, whereas heretofore it has been necessary, in delivering eggs, either to leave the carrier with the purchaser of the eggs, or to wait till the eggs are transferred to another receptacle, if one is available. Again, the construction of this carrier is adapted for removing the bag from it while the eggs are within the bag, without breaking the eggs. When the bag of eggs is removed the carrier is tilted up into the position shown in Fig. 3, in which the hinge D' is undermost. Then, as the cover is raised and the bag H straightened out, the eggs will be raised from their pockets and will slip down between the guides C and the convex bottom D' of the cover, as shown in Fig. 3, being prevented by them and by the folds of the bag, from dropping upon one another with force sufficient to break them.

What I claim is:—

1. An egg carrier comprising a concave box, a cover whose under side is convex, and transverse partitions dividing the intervening space between the box and its cover into pockets for the eggs, and provided with concave edges to receive the cover; substantially as shown and described.

2. An egg carrier comprising a concave box divided into pockets with transverse, concave upper edges for the eggs, and adapted to receive a bag and eggs within the bag; and a cover for the box, whose under side is convex and adapted when in place, to fold down the bag around the eggs, and to confine them within said pockets; substantially as shown and described.

3. An egg carrier comprising a concave box divided into pockets with transverse, concave upper edges for the eggs, and adapted to receive a bag and eggs within the bag; and a cover hinged to the box at one end, whose under side is convex and adapted, when closed, to fold down the bag around the eggs, and to confine them within said pockets; substantially as shown and described.

4. An egg carrier comprising a concave box adapted to receive a bag and eggs within the bag; a cover hinged to the box at one end, whose under side is convex and adapted, when closed, to fold down the bag around the eggs; and transverse partitions, dividing the box into pockets and provided with concave edges to receive the convex cover, whereby the eggs are retarded by said partitions and cover in falling to the bottom of the bag as the latter is removed from the box; substantially as shown and described.

FREDRICK W. NERLICH, Jr.

Witnesses:
D. GURNEE,
L. THON.